June 11, 1935. W. J. COULTAS ET AL 2,004,720

HARVESTER

Original Filed Jan. 16, 1933  9 Sheets-Sheet 1

FIG-7

June 11, 1935.  W. J. COULTAS ET AL  2,004,720
HARVESTER
Original Filed Jan. 16, 1933   9 Sheets-Sheet 8

INVENTORS
Wilbur J. Coultas
Norman F. Andrews
BY
Brown, Jackson, Boettcher & Dienner
ATTORNEYS WITNESS
Walter Ackerman

Patented June 11, 1935

2,004,720

UNITED STATES PATENT OFFICE 2,004,720

HARVESTER

Wilbur J. Coultas and Norman F. Andrews, Moline, Ill., assignors to Deere & Company, Moline, Ill., a corporation of Illinois Application January 16, 1933, Serial No. 651,886
Renewed November 24, 1934

31 Claims. (Cl. 56—18)

The present invention relates generally to agricultural implements of the wheel supported, tractor attachment type, i. e., implements which have more or less direct attachment to the tractor but which are provided with their own wheels for supporting some or all of the weight of the implement. In the exemplary embodiment herein shown, the implement consists of a multiple-row corn harvester comprising picking mechanisms for picking the ears of corn from the stalks, conveyors receiving the ears from the picking mechanisms, husking mechanisms receiving the ears from the conveyors and husking the corn, and elevator apparatus for discharging the husked ears of corn into an adjacent wagon or other receiving receptacle.

Certain aspects of our invention are concerned with an improved construction of wheel supported, implement frame, and with an improved manner of associating and connecting this frame with the tractor, these features being broadly applicable to different types of implements; other aspects of our invention are concerned with improvements more particularly pertaining to the corn harvester mechanisms, including the grouping and arrangement of the parts, the transmission of power thereto, etc.

One of the objects of the invention is to provide an improved wheel supported implement frame which substantially embraces the tractor. Such construction affords a very close-coupled assembly of short over-all length, which is particularly desirable for minimum turning space at the ends of the field. Another advantage of such construction is the immediate and direct response in steering. Since the implement frame embraces the tractor, the frame steers sidewise substantially directly with the tractor. This is particularly desirable for following plant rows, as, for example, in a corn harvester. The close-coupled assembly also enables the driver to have closer and better vision of the work, as in following plant rows.

Another object of the invention is to provide an improved propelling connection between this construction of implement frame and the tractor which will result in the major portion of the weight of the implement being borne on the wheels of the attachment frame, and which will permit said wheels and attachment frame to rise and fall relatively to the tractor in passing over uneven ground. In this regard, it is another object to provide an improved arrangement of resilient balancing means effective between the implement and tractor and cooperating with the improved propelling connection, whereby the implement is caused to run more steadily and smoothly. Another feature cooperating with the foregoing is the provision of an improved adjusting mechanism which enables the implement frame to be tilted fore and aft relatively to the tractor, as for raising and lowering implement parts, carried by the frame, relatively to the ground. Preferably this tilting motion occurs about the implement wheels.

Another object is to provide improved steering mechanism which causes the implement wheels to be steered in proper corresponding degree to the deflection of the steering wheel or wheels of the tractor.

Another object of the invention is to provide an improved corn harvester wherein the picking mechanisms and husking mechanisms are so arranged on this wheel supported frame as to substantially counterbalance each other over the implement wheels. This contributes to smoother running of the implement, and enables the operator to tilt the implement more easily for adjusting the height of the picking mechanisms relatively to the ground.

Another object is to provide an improved combination of driving mechanism for driving the snapping rolls and gathering chains of the picking mechanism, for driving the conveyors which carry the corn from the picking mechanisms to the husking mechanisms, for driving the husking mechanisms, and for driving the elevator which delivers the husked ears of corn into the adjacent wagon or other receptacle. In the preferred embodiment herein illustrated, the power for driving these several mechanisms is derived from a power take-off device on the tractor, and one of the objects of improvement is to provide a construction wherein the power transmitting connections may be established with this power take-off device in the most convenient, expeditious manner.

Another object is to provide an improved arrangement of the conveyors for conveying the corn from the picking mechanisms to the husking mechanisms.

Other objects and advantages of the invention will appear from the following detail description of a preferred embodiment thereof. In the accompanying drawings illustrating such embodiment:—

Figure 10:
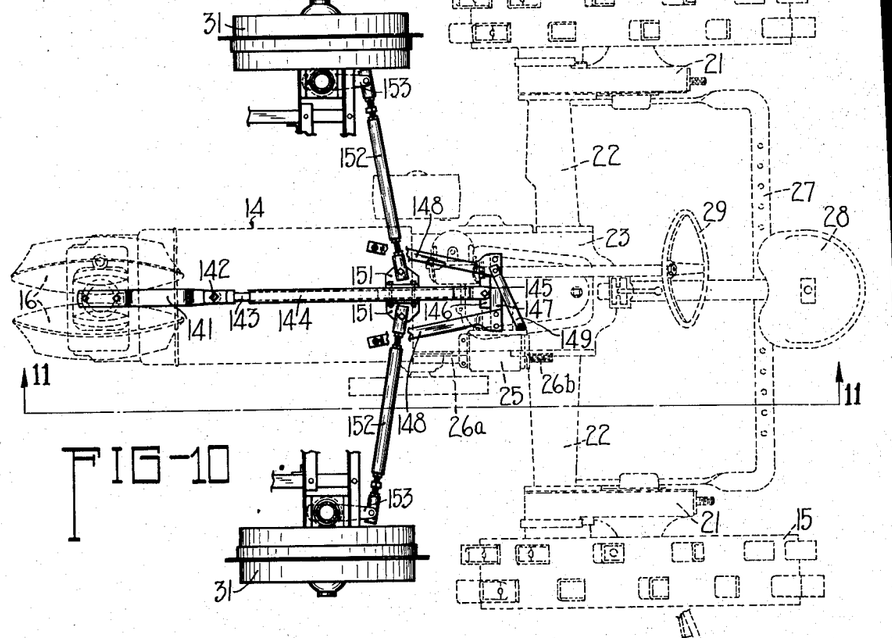
Figures 10 and 11 are plan and side skeleton views showing the steering connections established between the tractor steering wheels and the implement wheels, Figure 11 being a longitudinal section taken on the plane of the line 11—11 of Figure 10.
Figure 11:
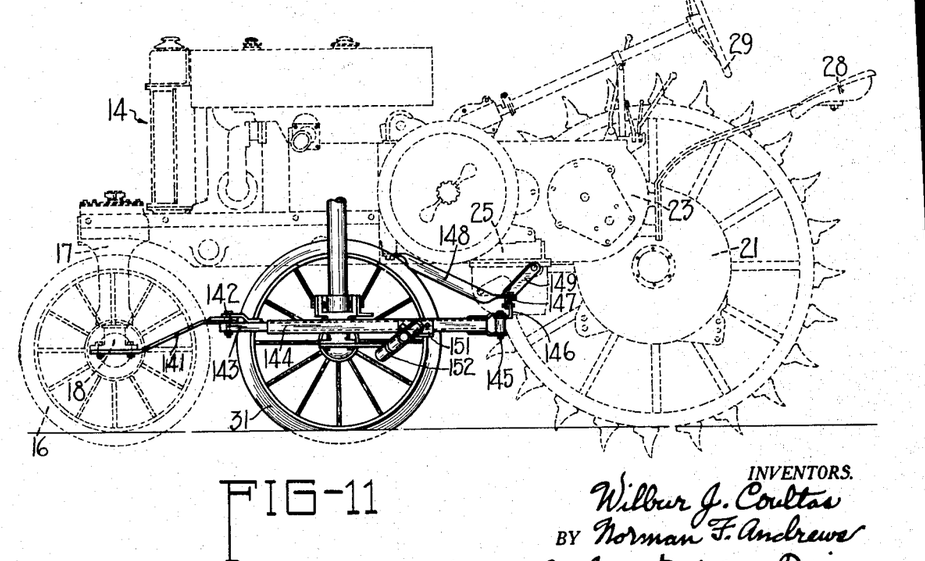

The tractor 14 may be of any conventional type, but is preferably of the three-wheeled or so-called tricycle type, comprising two relatively widespread rear traction wheels 15 and two adjacent steering wheels 16. The tractor is best illustrated in Figures 10 and 11, from which it will be seen that the two steering wheels 16 are placed close together to function in effect as one wheel, both swiveling around a common axis defined by a central steering column extending down between the wheels through a wheel supporting casting 17. This steering column has connection with a short transverse axle 18 on which the wheels are journaled. The stub axles of the rear traction wheels 15 are journaled in chain housings 21, in which are enclosed sprocket chains trained over sprocket gears on said stub axles and over sprocket pinions mounted on countershafts extending out through tubular housings 22. The latter housings are secured to the sides of a main central housing 23 in which are enclosed the selective speed transmission mechanism, differential, etc. The power take-off device is indicated at 25, being shown as disposed on the side of the main housing 23. Said power take-off device comprises a longitudinally extending shaft arranged to be driven from the tractor motor, the opposite ends 26a and 26b of said shaft being adapted for coupling to forwardly and rearwardly extending trains of motion transmitting parts. A U-shaped draw-bar 27 is suitably attached to the chain housings 21. The operator's seat is indicated at 28 and the tractor steering control wheel is indicated at 29.

In describing the implement, wherever corresponding parts are duplicated on both sides of the machine, we shall use the same reference numeral to designate these parts. The major portion of the weight of the implement attachment is carried on two similar side wheels 31. Preferably, these wheels 31 are positioned with their axes intermediate the axes of the rear and front tractor wheels 15, 16, substantially as shown, although it will be understood that said implement wheels may be positioned forwardly or rearwardly from the position illustrated. The major portion of the weight of the implement attachment is carried on these wheels 31 and the tilting of the implement to raise and lower the picking units occurs about said wheels. The two picking units 32 for a two-row machine are disposed at opposite sides of the tractor. In such two-row machine, the tractor steering wheels 16 travel between the two corn rows, and the rear tractor wheels 15 and the implement wheels 31 travel on the outer sides of the two rows. The two picking units 32 are disposed forwardly of the implement wheels 31. From the picking units, the corn is conveyed upwardly and rearwardly in conveyors 33, which incline or flare outwardly toward the rear of the implement. The upper ends of said conveyors discharge into chutes 34, which in turn feed the ears of corn to the husking boxes 35. The husking boxes 35 are disposed in rear of the implement wheels 31, where they counterbalance, to some extent, the weight of the forwardly extending picking units 32. The husked ears of corn are discharged from said boxes into chutes 36 both of which lead into a central hopper 37 provided at the lower end of elevator 38. The elevator is arranged to discharge rearwardly into a wagon being pulled behind the implement. The hopper 37 and elevator 38 are preferably supported on the drawbar 27 of the tractor.

Figure 5:
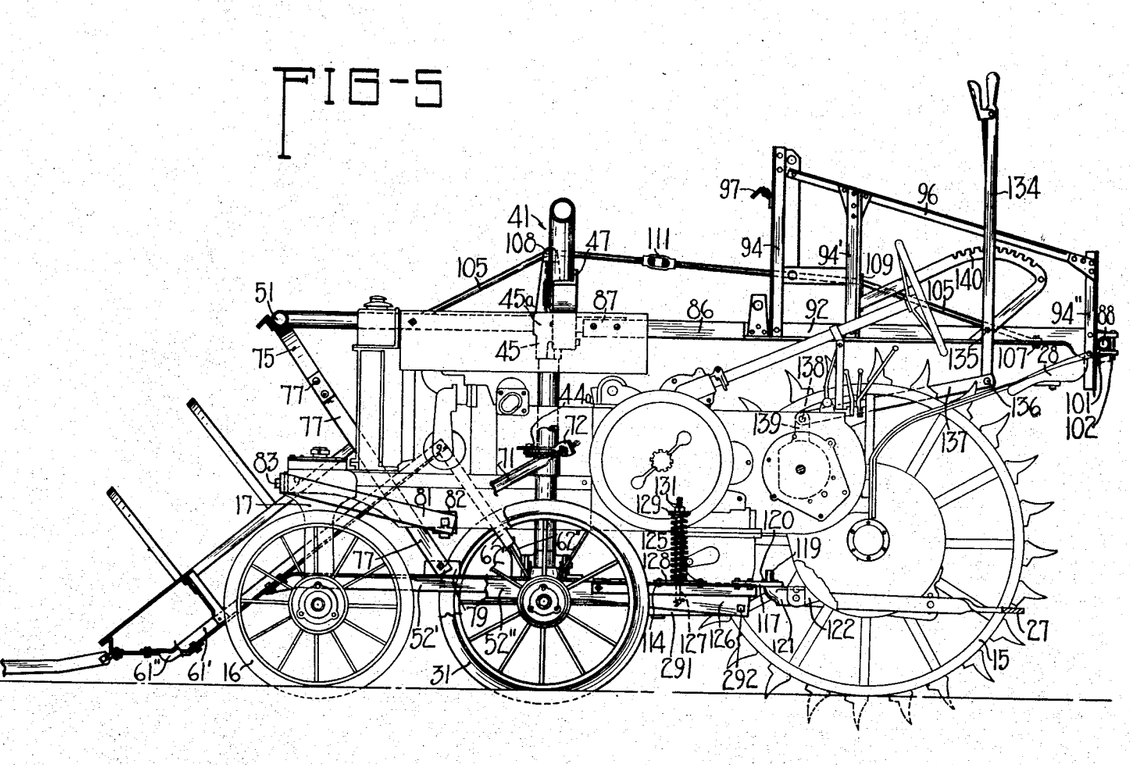

The picking units 32, conveyors 33, and husking boxes 35 are supported on a rigid frame structure, generally designated 41, which is carried substantially entirely on the implement wheels 31. The axles 42 on which said implement wheels are journaled are of L-shape (Fig. 7), having upwardly extending portions swiveled for rotation in the side leg portions of an inverted U-shape arch structure which constitutes the main supporting or bracing element of the frame 41. This arch structure comprises the parts 43, 44, 45 and 46. The vertical spindles of the axles 42 are journaled in the lower ends of sleeve castings 43. Pipe extensions 44 are bolted to the upper ends of said sleeve castings, as by clamping or like fastening members 44a, and to the upper ends of these pipe extensions are secured bracket fixtures 45. The post structures formed by said sleeve castings 43 and pipe extensions 44 define the side legs of the arch structure. Spanning these two post structures is arched frame member 46, the ends of which are welded or otherwise secured to angle brackets 47 which are bolted or otherwise secured to the bracket fixtures 45. The above described arch member 43—46 lies substantially in the transverse plane of the implement wheels 31, and has considerable strength for resisting outward spreading of said wheels. This arch spans the top of the tractor. The main frame 41 also comprises a forwardly extending, substantially horizontal arch 51, preferably consisting of a bent section of pipe having its ends bolted or otherwise secured in tubular sockets 45' formed on the bracket fixtures 45. As shown in Figure 5, the front end of the horizontal arch 51 clears the front end of the tractor. This horizontal arch braces the vertical arch in resisting outward spreading of the implement wheels. The main frame members supporting the husking boxes extend rearwardly substantially in prolongation of the ends of this horizontal arch, as we shall hereinafter describe.

Figure 4:
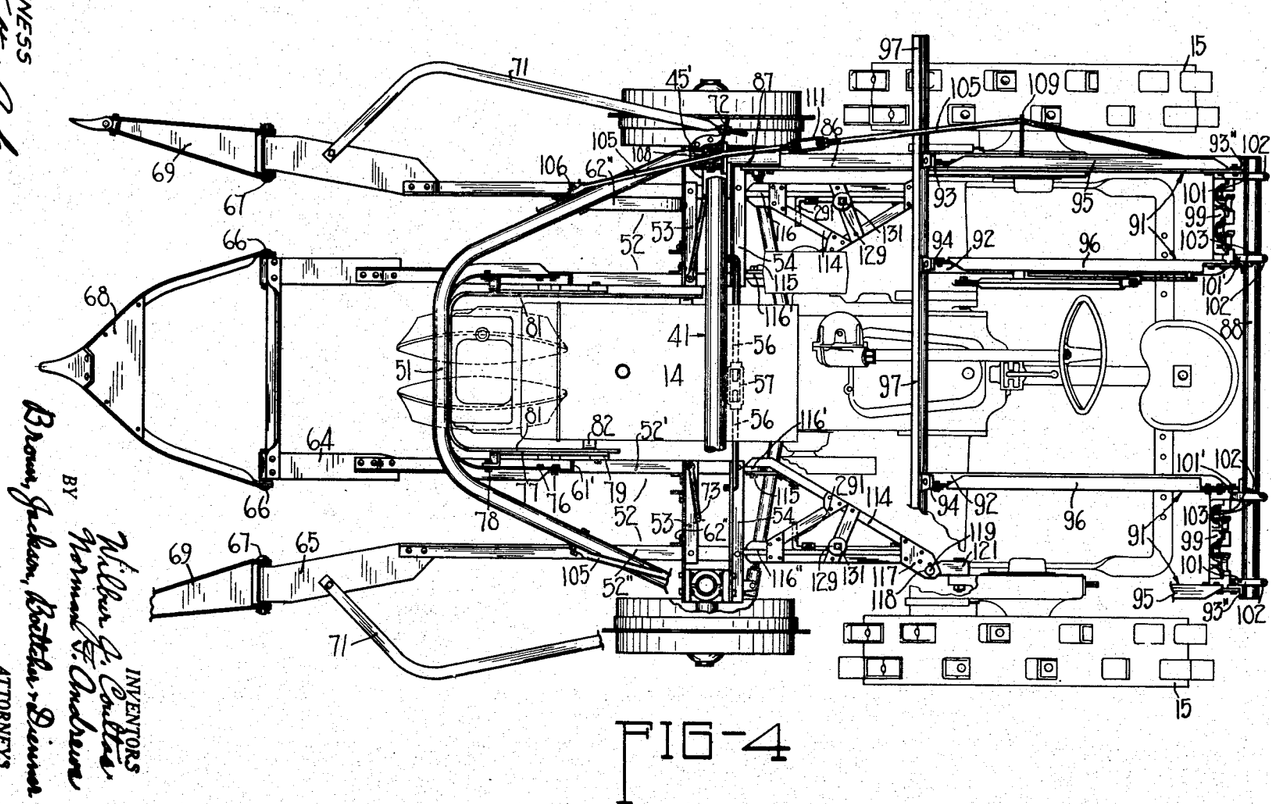
Figures 4 and 5 are fragmentary plan and side skeleton views showing the construction of the implement frame and its manner of attachment to the tractor.
Figure 7:
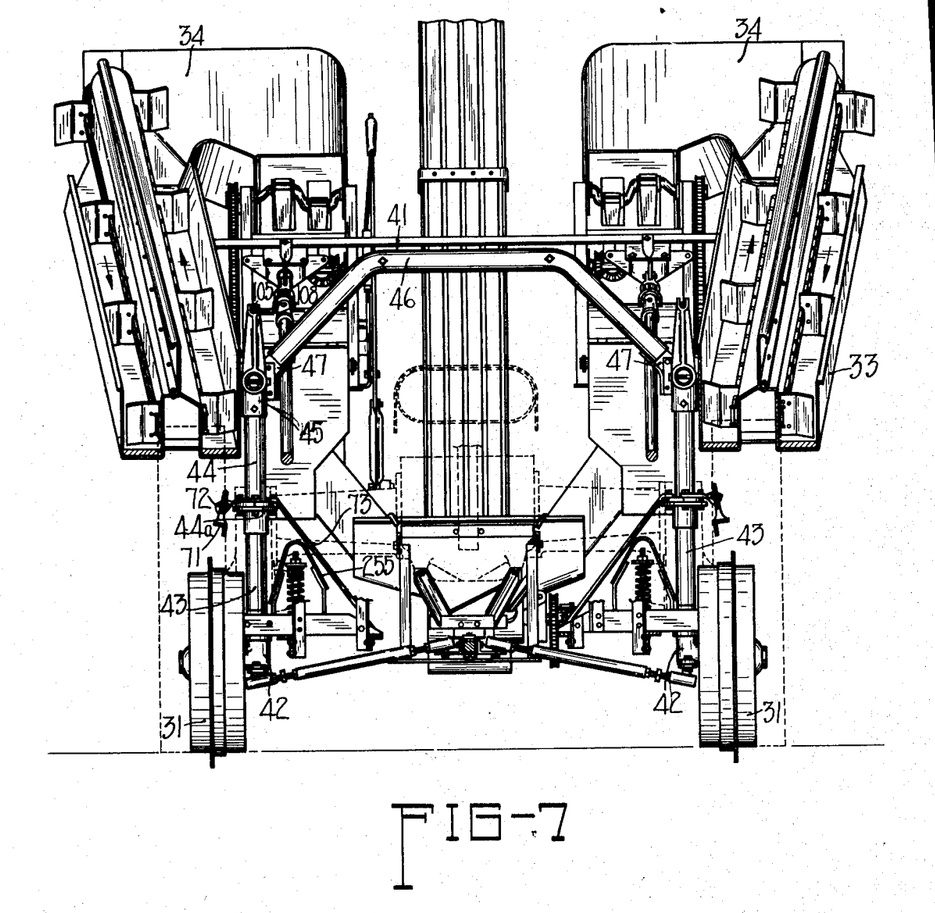
Figure 7 is a transverse vertical sectional view taken approximately on the plane of the line 7—7 of Figure 2.

The two picking units 32 are supported on separate auxiliary frames, designated 52 in their entireties, and best illustrated in Figure 4. Each of these auxiliary or sub-frames comprises two forwardly extending angle bars 52' and 52", which are spaced apart a distance to span the adjacent plant row. The rear portions of these two angle bars are cross-connected by two short angle bars 53 and 54 which have their inner ends terminating at the inner longitudinal bar 52' and which have their outer ends bolted or otherwise fastened to the front and rear sides of the adjacent sleeve casting 43 in which the implement wheel is swiveled for steering movement. The two sub-frames 52 are detachably tied together beneath the body of the tractor by tie rods 56 which have their outer ends hooked in holes in the rear transverse angle bars 54 and which have their inner ends operatively connected together by a turn-buckle 57. Referring to Figure 5, the forward ends of the longitudinally extending members 52' and 52" are bent down slightly for bolting to two inclined frame members 61' and 61" which project forwardly from the members 52', 52" and which have their rear ends extending upwardly above said longitudinal frame members. Said upper rear ends of the inclined bars are secured to brace bars 62' and 62" which incline downwardly and rearwardly and are then bent vertically for attachment to the front transverse bar 53, the outer inclined bar 62" being also secured to the outer longitudinal bar 52". Referring to Figure 4, the forward ends of the inclined bars 61' and 61" have extension members 64 and 65 secured thereto, respectively, and at the forward ends of these extension members there are provided horizontal hinge pins 66 and 67. Pivotally supported on these pins are the two outer floating shoe frames or gatherer points 69 and the single central shoe frame or gatherer point 68. Tension braces 71 are secured to the outer extension members 65 and extend upwardly and rearwardly for adjustable connection with brackets or lugs 72 (Figure 5) projecting outwardly from clamping members 44a secured to the pipe members 44 (Figure 7). The frames 52 are further braced by inwardly extending diagonal brace rods 73 which have lower attachment to the inner ends of the front transverse bars 53 and which have upper attachment to the clamping members 44a (Figure 7). The auxiliary frames 52 have braced connection with the horizontal arch 51 of the main frame through an arch-shaped angle bar 75 (Figure 5) which has its transverse portion welded or otherwise secured to the central portion of the horizontal arch 51 and which has its downwardly extending side legs secured by bolts 76 (Figure 4) to the inclined inner frame member 61'. A wear plate 77 extends downwardly substantially in prolongation of each side leg of said arched angle member 75. The upper end of each wear plate has an outwardly bent offset end which is secured by a bolt 78 to said downwardly extending leg of the arched angle member, and the lower end of said wear plate is fastened to a bracket 79 secured to the longitudinally extending frame bar 52' (Figure 5). These wear plates 77 are adapted to have rubbing contact with cooperating wear plates 81 mounted on the tractor, whereby to assure that other portions of the implement and tractor will not have rubbing contact in the relative movement between the two. Rub plates 81 extend along the sides of the tractor, having their rear ends secured to brackets 82 fastened to the under side of the tractor body, and having their front ends secured at 83 to the front side of the steering column housing 17. It will be seen from the description thus far that an open longitudinally extending space is defined between the two side auxiliary frames 52, into which space the relatively narrow front portion of the tractor can be driven in assembling the implement attachment on the tractor, the contact between the tractor rub plates 81 and the implement rub plates 77 properly locating the front end of the implement in this space. In assembled relation, the horizontal arch 51 extends around the front of the tractor and the vertical arch 46 extends across the top of the tractor. After the tractor has been driven into position within the implement, the lower transverse tie rods 56 are connected and drawn up under tension by the turn-buckle 57. As previously remarked, substantially the entire weight of the implement attachment is carried by the implement wheels 31, and the major portion of this weight hangs between the tread lines of said wheels; from whence it will be seen that the tendency of the weight is to spread the implement wheels outwardly away from the tractor. The vertical and horizontal arches 46 and 51 resist these spreading stresses, and any possibility of spreading is effectively precluded by the transverse tie rods 56 extending below the tractor body.

Figure 2:
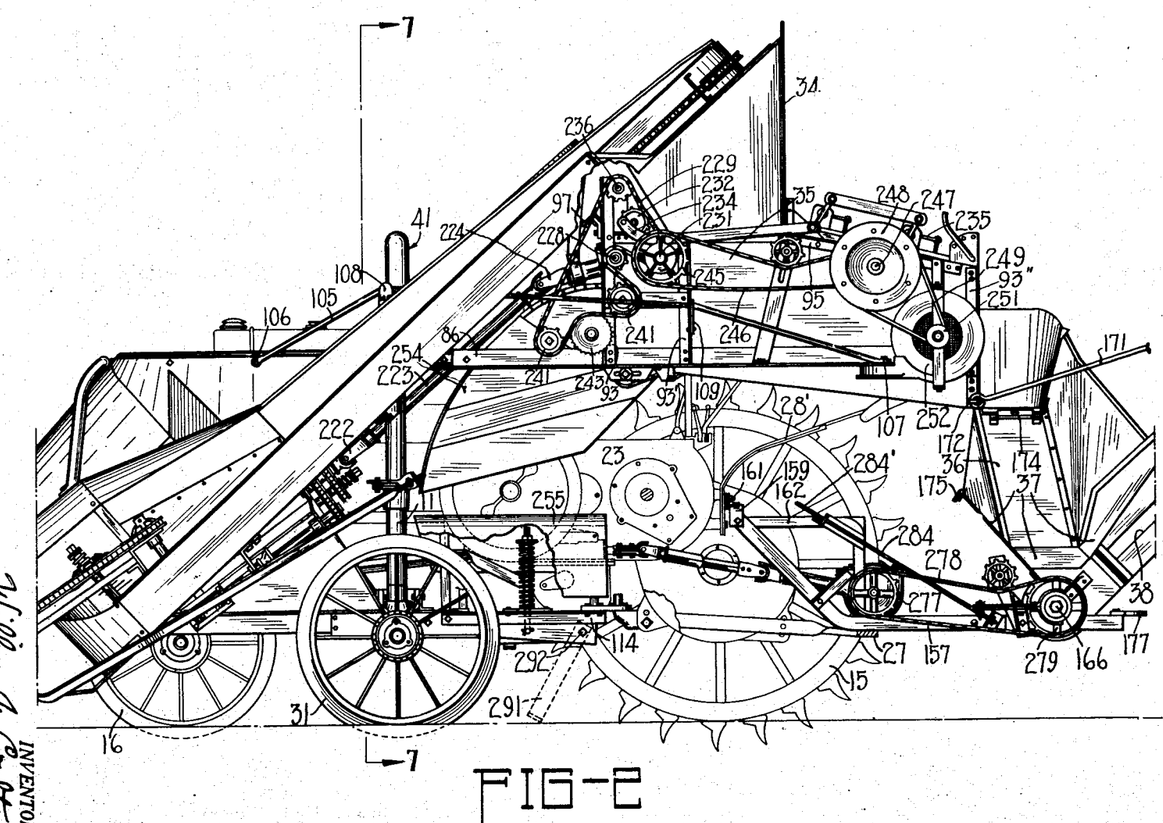
Figure 2 is a fragmentary side view with portions broken away, the near driving wheel of the tractor being omitted for illustrating adjacent parts of the implement.

Referring now to the rearwardly extending portion of the main frame structure which supports the husking boxes 35, it will be seen from Figures 4 and 5 that angle bars 86 extend rearwardly from the bracket fixtures 45 on the upright posts 43, 44. These angle bars are secured to pipe members 87 which are bolted in the horizontal tubular sockets 45a of the bracket fixtures 45, and which pipe members may consist of independent short lengths of pipe or may consist of the rearwardly extending ends of the horizontal arch 51. The rear ends of the longitudinal angle bars 86 are connected together by a transverse pipe 88 which is connected to said angle bars in a manner to be later described. Said angle bars carry two auxiliary frame structures 91 at the opposite sides of the implement, which auxiliary frame structures mount the husking boxes 35. Each of these auxiliary frames comprises the rear portion of the adjacent angle bar 86, and an inwardly spaced parallel bar 92. Rising from each outer bar 86 are three vertical angle members 93, 93' and 93" (Figure 2), and rising from the inner bar 92 are three vertical angle members 94, 94' and 94" (Figure 5). The upper ends of the first series of vertical bars are connected by a longitudinal bar 95 (Figure 2) and the upper ends of the second series of bars are connected by an inclined bar 96 (Figure 5). The two sub-frames 91 which are thus formed by the aforementioned angle bars, are cross-connected at their front ends by a transverse angle bar 97 which is suitably secured to each of the four front angle bars 93, 93 and 94, 94. Mounted transversely at the rear end of each sub-frame 91 is a husking roll bearing supporting casting 99 which has its ends bolted or otherwise fastened to the outer and inner longitudinal angle bars 86 and 92. U-shaped brackets 101 and 101' project rearwardly from the outer and inner ends of these bearing supporting castings 99. The transverse pipe 88 is detachably mounted in these U-shaped brackets by pins 102 passing down through the arms of said brackets on the rear side of the rear side of the pipe. The pipe is also utilized to hold the two sub-frames 91 against lateral spreading, such being accomplished by passing stop pins 103 down through holes in the pipe on opposite sides of each inner bracket 101', whereby to prevent relative movement between said bracket and pipe either inwardly or outwardly of the implement. The transverse pipe is removed when the tractor is being driven into the implement for assembly, or is being backed out of the implement. The sub-frames 91 have suspension bracing established by tension rods 105 which have their forward ends fastened at 106 to the horizontal arch 51 and which have their rear ends fastened at 107 to the main angle bars 86. The intermediate portion of each tension rod extends upwardly over a notched rest 108 rising from the adjacent bracket fixture 45, and then extends outwardly and downwardly over a supporting arm 109 projecting outwardly from each vertical angle bar 93' (Fig. 2). A turnbuckle 111 in each rod 105 enables the latter to be placed under any desired tension. The two husking boxes 35, including the husking rolls, driving mechanism, blower, etc., are suitably mounted on these two sub-frames 91. The space between said sub-frames and the husking boxes supported thereon enables the fore-part of the tractor to be driven therebetween in attaching the implement to the tractor, and this space accommodates the operator in his position on the tractor seat 28.

The propelling connections between the tractor and implement comprise a pair of link or frame structures 114, disposed one at each side of the implement, as best shown in Figure 4. These connecting frame structures are of triangular-shape and have their divergent forward ends pivotally connected with the implement frame on a horizontal pivot axis. Said pivot axis is defined by inner and outer pivot pins 115 passing through the inner and outer arms of the frame 114 and also passing through lugs or pivot portions 116' and 116" projecting rearwardly from the sub-frame members 52' and 52". The rear ends of the connecting frames 114 have plates 117 secured thereto, which are provided with apertures 118 adapted to slip down over upstanding lugs or stud pins 119 attached to the tractor. The studs 119 project upwardly from brackets 121 (Fig. 5) which are suitably fastened to the chain housings 21 of the tractor, being fastened, as for example, by attachment to lugs 122 which project forwardly from these housings for connection with a draw-bar. The apertures 118 are sufficiently larger than the studs 119 to permit a certain amount of vertical or rocking movement of the connecting frames 114 relatively to the studs. Suitable cotter pins 120 or the like prevent the accidental displacement of the plates 117 up over the upper ends of the studs.

Although the implement is substantially balanced over the implement wheels 31, it is desirable that a slight preponderance of the weight tend to tilt the implement in one direction about said wheels, it being found that such affords a smoother running operation of the implement. Preferably, this slight preponderance of weight is disposed to the rear of the wheels 31, so as to tend to tip the front end upwardly, although this might be reversed by having the preponderance of weight in the front. It has also been found advantageous to exert a resilient balancing tendency against such preponderance of weight, and to this end a pair of compression springs 125 are arranged to be effective between the implement frame and the tractor, preferably by having one of these springs exert pressure between each propelling frame 114 and an associated rigid frame arm 126 which projects rearwardly from the implement frame under the propelling frame. These arms 126, which may be integral extensions of the outer pivot portions 116", slope downwardly to the rear to permit limited vertical tilting movement between said arms and the propelling frames. Rods 127 have their lower ends suitably anchored to said arms 126 and extend upwardly through apertured plates 128 secured to each propelling frame 114. The compression springs 125 encircle these rods, and are confined between the plates 128 and washers 129 at the upper ends of the rods. Said upper ends are threaded for the reception of nuts 131 which bear against the tops of the washers 129 and enable any suitable pressure to be imposed on the springs 125. The pressures imposed on said springs may be adjusted to counterbalance either all or only a portion of the preponderating weight effective to the rear of the implement wheels.

Provision is made for tilting the implement frame, as for raising or lowering the picking units 32 relatively to the ground. This is accomplished by an adjusting lever 134 which is pivotally supported at 135 on frame bar 92, adjacent to the operator's position on tractor seat 28. The lower end of said lever is pivotally connected at 136 to a link 137 which extends forwardly for pivotal connection at 138 to a suitable lug or bracket 139 on the tractor frame. The lever 134 has conventional cooperation with a suitable latching sector 140 for holding the lever in any adjusted position. It will be evident that rocking the lever 134 forwardly transmits forward thrust to the frame pivot 135 and tilts the implement frame forwardly over the supporting wheels 31, thereby lowering the picking units 32, and that rocking said lever in the opposite direction tilts the frame rearwardly, thereby raising the picking units. The tilting of the implement frame occurs partly around the wheel axes and partly around the tiltable end connections of the propelling frames with the implement and with the tractor.

It will be evident that the hinged connections established from the implement frame to the tractor through the propelling frames 114 permit the implement frame and its supporting wheels 31 to rise and fall relatively to the tractor in passing over uneven ground. The lost motion or play afforded by the loose fit of the holes 118 over the studs 119 also permits one side of the implement frame to rise or drop down relatively to the other side and to the tractor, in encountering irregular ground. The tilting link 137, in extending more or less parallel to the propelling links 114, does not appreciably tilt the implement fore and aft in any such rising and falling movement. Any tendency for the implement frame to be tilted fore and aft by ground shock or work resistance is yieldingly resisted by the springs 125.

The implement wheels 31 are steered simultaneously with the tractor steering wheels 16 through the instrumentality of mechanism which is best illustrated in Figures 10 and 11. A rearwardly extending arm 141 is rigidly bolted to the under side of the axle 18 of the front truck of the tractor. A vertical pivot bolt 142 connects the rear end of said arm with a slide bar 143 which has telescopic sliding engagement within a longitudinally extending tube 144, the bar and tube preferably being of such construction as to prevent rotation of the bar within the tube. Said bar and tube constitute a telescopic arm which is adapted for sidewise swinging about a vertical pivot bolt 145 passing down through the clevis-shaped rear end of the arm. Said pivot bolt 145 is carried by a stationary bracket 146 which is fixedly suspended below the transmission case 23 of the tractor by a transverse bar 147, forwardly extending brace bars 148 and diagonal brace bar 149. Brackets 151 are secured to opposite sides of the telescopic arm 143—144, and links 152 have their inner ends pivotally connected with said brackets. The outer ends of said links are pivotally connected with steering arms 153 fixed to and projecting rearwardly from the L-shaped axles 42 of the implement wheels 31. By virtue of the above described mechanism, the implement wheels are turned simultaneously with the steering truck wheels 16 of the tractor, and the lengths of the arms 153 and the position of the brackets 151 on the telescopic arm 143—144 are such that the implement wheels turn in approximately a correct differential relationship with respect to the wheels of the tractor steering truck. The steering links 151 are preferably made with adjustable sections whereby the effective lengths of said links may be increased or decreased, and the brackets 151 may also be arranged for adjustable shifting to different positions along the telescopic arm, if desired.

Figure 6:
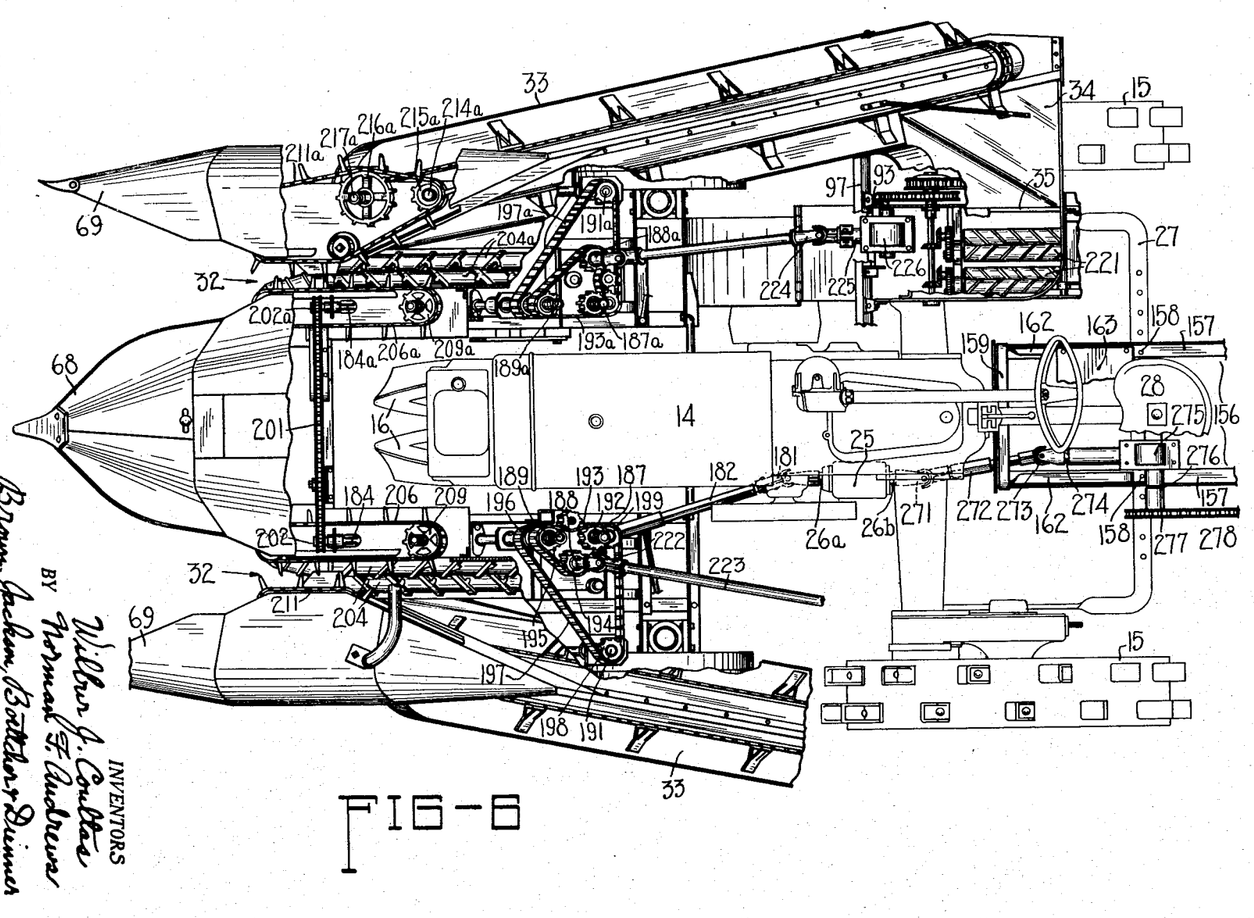
Figure 6 is a plan view with certain frame and housing parts broken away to better illustrate the driving connections for the picking units, husking units and elevator.
Figure 9:
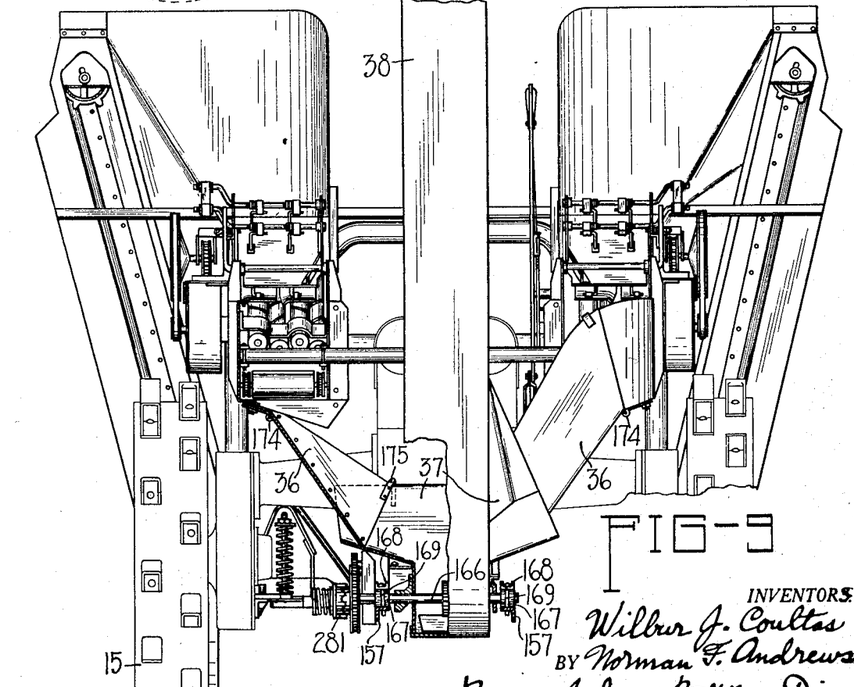
Figure 9 is a fragmentary rear view, with parts broken away to illustrate the husking units and some of the parts establishing the driving connection with the rear elevator.

Referring now to the manner of mounting the elevator 38 and its associated hopper 37 on the tractor, it will be observed from Figure 6 that the tractor draw-bar 27 is utilized to support a rectangular frame 156 which projects rearwardly from the tractor. It is on this frame that the elevator and its hopper are supported. Said frame comprises two longitudinally extending angle bars 157 which rest on the top of the draw-bar 27 and are held against sidewise shifting thereon by pins 158 passing through said angle bars and downwardly through holes in the draw-bar. Referring to Figure 2 the forward portions of the angle bars 157 are bent upwardly, and at their front ends are connected by a transverse bar 159. The latter bar is secured to the tractor frame by bolts 161 which, in the type of tractor shown, may be the same bolts which secure the seat support 28' to the transmission case 23. Right angle bars or brackets 162 are secured to the forward portions of the bars 157, and fastened across the horizontal legs of said right angle members 162 is a board 163 which serves as a platform for the operator. The lower driving shaft 166 of the elevator 38 is mounted transversely across the rear portion of the frame 156. Referring to Figure 9, said shaft is journaled in bearing bosses 167 which are detachably supported on the frame bars 157. This detachable mounting may be afforded by inserting the bearings into the open rear ends of clevis-like constructions on the frame, established, for example, by open-ended angle brackets 168 secured to the top sides of the frame bars 157, with the open ends of said angle brackets facing rearwardly. After the bearings 167 have been thrust forwardly between these angle brackets and the frame bars, they are retained in position by removable pins or bolts 169 passing down across the open ends of the angle brackets, through said brackets and frame bars. The elevator 38 is pivotally mounted on the transverse drive shaft 166, and the hopper 37 is secured to the elevator, to be carried thereby. The elevator is held in a rearwardly inclined position by means of a pair of forwardly extending tension rods 171. The rear ends of these rods are connected to the elevator near the upper end thereof, and the forward ends thereof are connected to brackets 172 which are secured to the upwardly extending angle bars 93". The brackets 172 are so positioned that the line of pull extending along the length of each rod 171 projects forwardly to a point either intersecting the axes of the implement wheels 31, or passing in close proximity to said wheel axes. As a result of this arrangement, the weight of the elevator 38 does not disturb the balance of the tiltable implement frame 41, nor does it affect the tilting of the implement relatively to the tractor. As the implement is tilted, the brackets 172 move in a line approximately perpendicular to the tension rods 171.

The chutes 36 which direct the corn from the husking boxes into the hopper 37 are pivoted at 174 (Figure 9) to the husking boxes, and lead down into and rest upon the hopper 37. These chutes are provided with hooks 175 which are adapted to hook over the forward edge of the hopper 37 to hold the chutes in proper position.

A supplementary draw bar 177 is connected across the rear ends of the frame bars 157 and is provided with holes therein for establishing a draft connection with a wagon towed in rear of the implement, and into which the corn is delivered by the elevator 38.

We shall now describe the driving apparatus for transmitting power to the picking units 32, the conveyors 33 and the husking boxes 35, and in that connection, shall describe in greater detail some of the operating parts of some of these units or mechanisms. The power for driving the picking units, conveyors and husking boxes is taken from the front end 26a of the power take-off shaft on the tractor, the rear end 26b of said shaft being utilized to transmit power to the elevator 38, as we shall later describe. A power transmitting connection is established with said front end 26a through a universal joint 181, telescopic connection 182 and universal joint 183 (see Figures 6 and 8). The front universal joint 183 is operatively connected with a forwardly extending shaft 184 which is journaled in a gear box 185 and in a front bearing 186. Said gear box and bearing are supported on the auxiliary frame structure 52 of the lefthand picking unit 32. Enclosed within the housing 185 is a pair of bevel gears which transmit power from the shaft 184 to a shaft 187 which inclines upwardly and rearwardly substantially parallel with the picking units. Also extending substantially parallel with said shaft 187, and driven thereby, are three power transmitting shafts 188, 189, and 191 (see Figure 6). A sprocket 192 on shaft 187 transmits power through a chain 193 to sprocket pinions 194 and 195 mounted respectively on shafts 188 and 189. The shaft 189 carries a second sprocket 196 which transmits power through a chain 197 to a sprocket 198 on shaft 191, this chain also passing over an idler sprocket 199.

The righthand picking unit 32 has a similar arrangement of driving apparatus (the same reference numerals, with the subscript "a" appended, designating like parts), this train of driving mechanism including the shaft 184a, gear box 185a, shaft 187a, and supplementary shafts 188a, 189a and 191a driven by the chains 193a and 197a, all as above described. Power is transmitted from the lefthand assembly of driving apparatus to the righthand assembly through a transverse chain 201 which extends from one picking unit to the other at a point across in front of the tractor. This chain is trained over sprockets 202 and 202a mounted on the shafts 184 and 184a, respectively, whereby the lefthand assembly of driving mechanism transmits power from the shaft 184 and chain 201 to the shaft 184a and its associated righthand assembly of driving mechanism.

Figure 8:
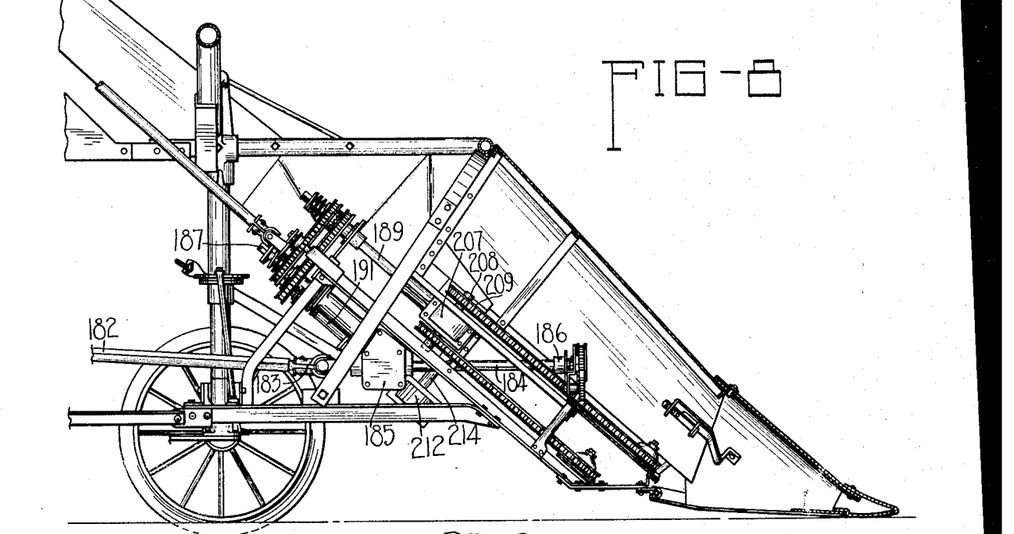
Figure 8 is a longitudinal detail section through the lefthand picking unit for illustrating the driving connections to the different parts of the picking units.

The snapping rolls 204, 204a of each picker unit are driven from the shafts 188 and 188a, these shafts being operatively connected with one roll of each pair, and the other roll being driven by intermeshing gears on the shafts of the two rolls. The shaft 188 for the lefthand unit is operatively connected with the inner snapping roll 204, and the shaft 188a for the righthand unit is operatively connected with the outer snapping roll 204a, whereby to obtain proper direction of rotation of the rolls. The shafts 189 and 189a drive the inside gatherer chains 206 and 206a. Referring to Figure 8, the shaft 189 extends downwardly and forwardly into a gear box 207 wherein it is connected through bevel gears with shaft 208 which carries the upper drive sprocket 209 over which the inner gatherer chain 206 is trained. A like arrangement of driving parts transmits power from the righthand shaft 189a to the righthand gatherer chain 206a. The shafts 191, 191a are arranged to transmit power to the outer gatherer chains 211, 211a, and also to the two side conveyors 33. Referring to Figure 8, the shaft 191 extends into a gear box 212 where it connects through bevel gears with the shaft 214 which extends upwardly and forwardly to the adjacent gathering chain, this arrangement being duplicated at the righthand side of the machine. Figure 6 illustrates the operative connection of the companion righthand shaft 214a with its outer gatherer chain 211a. A sprocket wheel 215a is mounted on said shaft and the upper bight of the chain travels over said wheel. A sprocket wheel 216a is driven by the chain and the shaft 217a of this sprocket wheel extends downwardly to the lower end of the adjacent conveyor 33, where it drives the sprocket wheel which meshes with the traveling chain of the conveyor. The above described arrangement for driving the outer gatherer chain and the conveyor is duplicated at the lefthand side of the machine.

Figure 1:
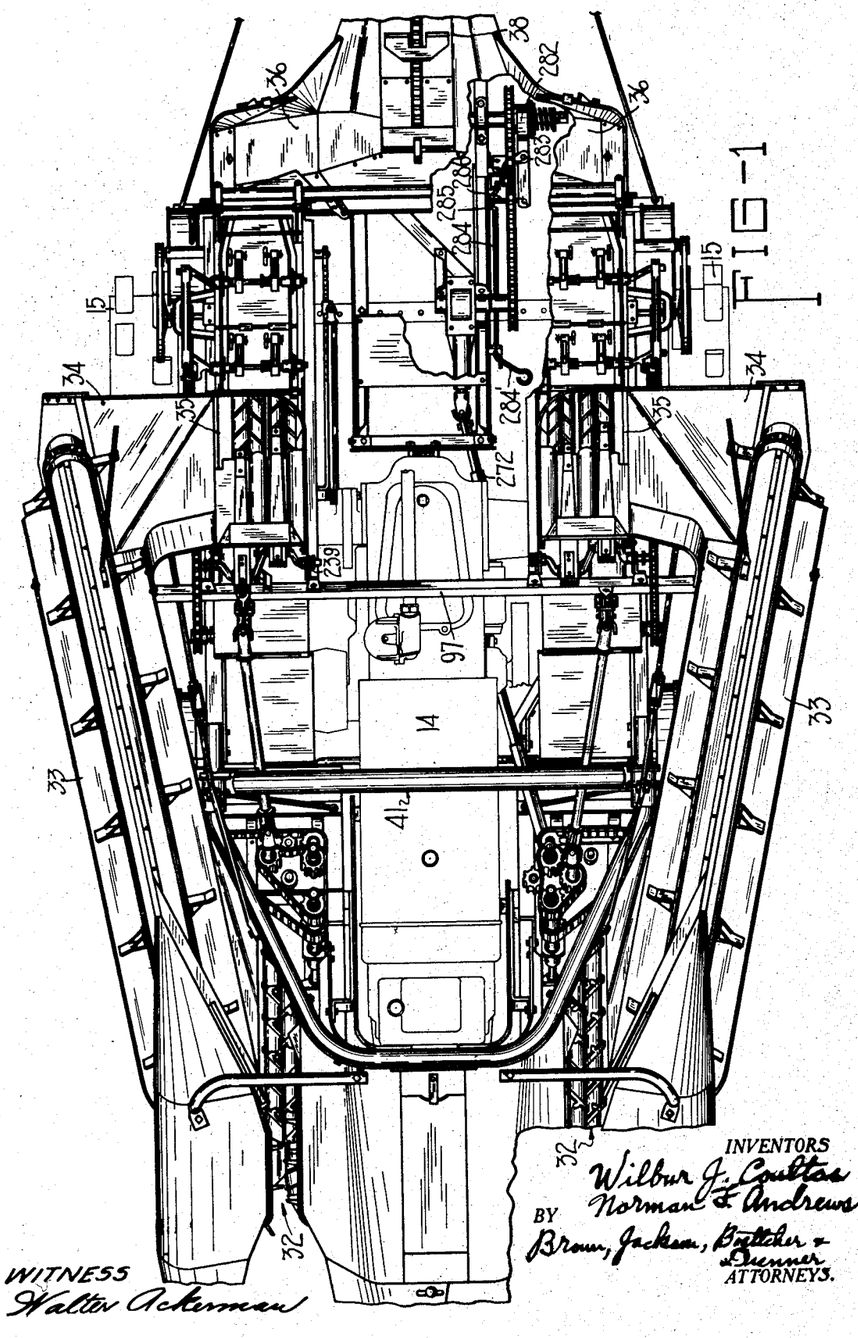
Figure 1 is a fragmentary plan view of the implement attachment and tractor, portions of the implement being broken away for convenience of illustration, and the tractor being illustrated in light lines.

It will be observed from Figures 1 and 6 that each of the two conveyors 33 is inclined or flared outwardly in extending upwardly and rearwardly from the picking units to the husking boxes, such enabling the conveyors to clear the upright post members 43, 44. This outwardly divergent angle also accommodates a preferred arrangement of operating and driving connections adjacent to the front end of each husking box. The upper ends of the conveyors are supported on the outer ends of the transverse brace bar 97, and by virtue of this arrangement the conveyors aid in bracing the husking box frames 91 against inward or downward deflection. The chutes 34 direct the ears of corn from the conveyors inwardly into proper position on the husking rolls 221.

Power for driving the husking mechanisms is transmitted from the shafts 188, 188a through universal joints 222 and shafts 223 extending upwardly therefrom. The upper ends of the latter shafts are connected through universal joints 224 with short shafts 225 which enter gear boxes 226, the latter being secured to the vertically extending frame members 93 and to brackets carried by the transverse brace member 97. Bevel gears in these boxes transmit power to short outwardly extending shafts 228 which have sprockets on their outer ends over which is trained a chain 229 (Figure 2). Said chain transmits power to the husking roll drive shaft 231, through a sprocket wheel on said shaft, and also transmits power to a sprocket wheel 232 with which the pitman 234 is eccentrically connected. Said pitman transmits rocking movement to the retarders, generally indicated at 235. The chain 229 is also trained over a sprocket wheel mounted on the end of crank shaft 236, with which crank shaft the kickers 237 are connected. Said crank shaft is journaled in bearings 239, which are fastened to the transverse brace member 97. The chain 229 passes over two idler sprockets 241 and 242 and over an intermediate sprocket wheel 243 which is mounted on a shaft carrying the front roller of the husk conveyor, which husk conveyor is positioned underneath the husking rolls 221. A relatively large sprocket wheel 245 is mounted on the outer end of the husking roll drive shaft 231, and over this sprocket is trained a chain 246 which passes over a sprocket on shaft 247. On the outer end of the latter shaft is fixed a large pulley 248 which transmits a relatively high speed rotation to pulley 251 through belt 249. The small pulley 251 drives the fan or blower 252 which projects a blast of air forwardly through the lower part of the husking box. Downwardly curved hoods 254 are provided at the forward ends of the husking boxes for directing the husks, silk, stalks and other trash down onto inverted V-shaped shields 255. These shields are mounted on the propelling frames 114 and cover the counterbalancing springs 125, serving to deflect the trash projected from the hoods 255 downwardly upon the ground to either side of the propelling frames.

It will be observed from the foregoing that all of the power transmitting connections for driving the snapping rolls, gatherer chains, conveyors and husking boxes, branch off from the single power transmitting connection 181, 182 connecting with the front end 26a of the power take-off shaft. This greatly simplifies the operations of connecting the implement to the tractor, and disconnecting the same, the single power transmitting connection being established by feeding one part of the telescopic connection 182 into the other part as the tractor is driven forwardly into position in the implement. Suitable slip clutches are in the different branch paths of power transmitting connections so that overloads at any one or more points cannot cause breakage or injury of the mechanism. For example, overload slip clutches interposed between the shafts 187, 187a and the sprocket pinions 192, 192a prevent overload from any jamming of the snapping rolls or from the husking mechanisms; slip clutches interposed between the sprocket pinions 195, 195a and their respective shafts 189, 189a prevent overload from any jamming of the inner or outer gatherer chains; and slip clutches interposed between the sprocket wheels 216, 216a and their respective shafts 217, 217a prevent any overload from the possible jamming of the conveyors 33.

As previously remarked, the elevator 38 is driven from the rear end 26b of the power take-off shaft. Referring first to Figure 6, a universal joint 271 establishes connection between this power take-off shaft and a telescopic drive connection 272, and a second universal joint 273 establishes connection between this telescopic drive member and a shaft 274 which enters the gear housing 275. Said gear housing is mounted on the detachable rear frame 156. A pair of bevel gears within said housing transmit a drive to a laterally extending shaft 276 on the outer end of which is mounted a sprocket 277. A chain 278 trained over said sprocket transmits power to a sprocket wheel 279 which is secured to the elevator drive shaft 166, previously referred to. The operative connection between sprocket wheel 279 and the elevator drive shaft 166 includes a jaw clutch 281 which is best illustrated in Figure 9. The shiftable element of said jaw clutch may be thrown into and out of operative position by a forked shifting member 282 which is pivotally supported on frame 156 at 283 (Figure 1). Said shifting member is adapted to be rocked by an oscillatable control rod 284 which has suitable bearing support on the frame 156 and which has a handle portion 284' at its upper end, in a location convenient to the operator's position on the tractor seat 28. The lower portion of said rod 284 has a crank 285 formed therein and a link 286 extends from this crank to the forward end of the shifting lever 282, whereby oscillation of said rod 284 is operative to throw the jaw clutch 281 into and out of engagement for starting or stopping the elevator 38. It will be seen that when the elevator is mounted on or discounted from the tractor, the associated power transmitting connection can be readily coupled or uncoupled at the telescopic member 272 or at the universal joint 271.

The implement is disconnected from the tractor in the following manner:—

The elevator 38 is removed, such being permitted by disconnecting the tension rods 171 from the brackets 172; removing the drive chain 278 from the sprocket wheel 279; and removing the bearings 167 from the open rear ends of the angle brackets 168. Thereupon, the elevator 38, with its shaft 166, can be lifted out of position. The chutes 36 are disconnected from the ends of the husking boxes 35.

Figure 3:
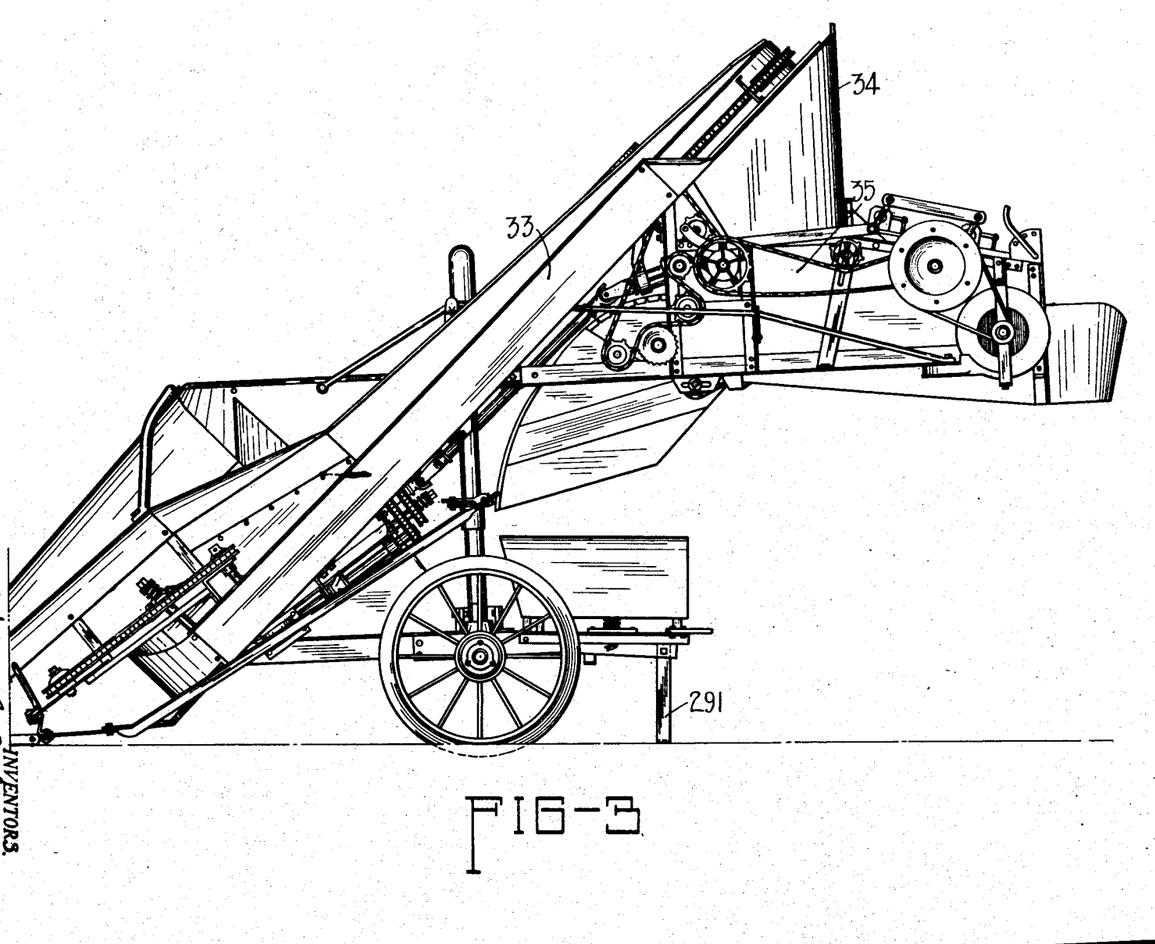
Figure 3 is a fragmentary side elevational view showing the implement attachment set up in position for receiving the tractor, which is driven into proper position between the side portions of the implement for attaching the latter thereto.

The main implement frame is then tilted forwardly until the gatherer points rest on the ground, this position of the implement being illustrated in Figure 3. Rear supporting legs 291 are then dropped into engagement with the ground, these legs being pivotally connected at 292 to the ends of the downwardly inclined, rear frame arms 126, and being normally held in elevated position. Said folding legs are first dropped into inclined positions in contact with the ground, as illustrated in dotted lines in Figure 2. Thereupon, the tractor is driven forwardly a short distance to cause these legs to swing backwardly to the upright positions illustrated in Figure 3. The implement frame is now resting on its gatherer points and on the supporting legs 291 and on its wheels 31.

The steering connections are released by disconnecting the brackets 151 (Figure 10) from the telescopic tube member 144, and the tie links 152, with the brackets 151 attached thereto, are swung rearwardly out of the way of the front wheels 16 of the tractor, when the tractor is to be backed out of the implement.

Turn-buckle 57 is loosened to permit the removal of the transverse tie rods 56. The transverse rear pipe 88 is withdrawn by removing the vertical pins 102 from the ends of the U-shaped brackets 101, and pulling the pipe out from the open ends of these brackets. The pressure of the counterbalancing springs 125 is released by backing off the nuts 131, preparatory to disconnecting the propelling frames or links 114 from the tractor. The latter operation is performed by simply removing the cotter pins 120 and swinging the frames upwardly to free the apertured plates 117 from the lugs 119. The link 137, connecting the tilting lever 134 with the tractor, is disconnected from the tractor. Thereupon, the tractor can be backed free of the implement.

To connect the implement to the tractor, the above steps are followed substantially in reverse order. The two sections of the telescopic drive member 182 are fed one into the other as the tractor is driven forwardly into position within the implement.

While we have illustrated and described what we regard to be the preferred embodiment of our invention, nevertheless it will be understood that such is merely exemplary and that numerous modifications and rearrangements may be made without departing from the essence of the invention.

We claim:—

1. The combination with a tractor, of an agricultural implement comprising a frame adapted to embrace the tractor, a supporting wheel for said frame, means connecting said frame with said tractor permitting said frame and wheel to move relatively to said tractor, picking mechanisms on said frame at opposite sides of the tractor, and husking apparatus on said frame adjacent to the rear end of the tractor.

2. The combination with a tractor, of an agricultural implement comprising a frame embracing the forward end of the tractor, a supporting wheel for said frame, means connecting said frame with said tractor permitting said frame to tilt fore and aft relatively to said tractor about said wheel, picking mechanism on said frame and projecting forwardly from the vertical plane of the axis of said wheel, and husking mechanism on said frame extending rearwardly from said plane.

3. The combination with a tractor comprising rear traction wheels and a front steering wheel, of an agricultural implement comprising a frame embracing the tractor, a dirigible supporting wheel for said frame, means connecting said frame with said tractor permitting said frame and dirigible wheel to move vertically relatively to said tractor, steering means for causing said dirigible wheel to be steered concurrently with the front steering wheel of the tractor, picking mechanisms on said frame at opposite sides of the tractor and projecting forwardly from the vertical axial plane of said dirigible wheel, and husking apparatus on said frame extending rearwardly from said plane.

4. The combination with a tractor comprising traction wheels and a steering wheel, of a corn harvester associated with said tractor comprising a frame, a supporting wheel for said frame disposed intermediate the ends thereof, means connecting said frame with the body of said tractor permitting said frame and wheel to move vertically relatively to said tractor, picking mechanism on the forward portion of said frame, and husking mechanism arranged on the rearward portion of said frame substantially to counterbalance said picking mechanism over said supporting wheel.

5. The combination with a tractor comprising traction wheels and steering wheels, of a corn harvester associated with said tractor comprising a frame, supporting wheels for said frame, a propelling connection between the body of said tractor and said frame permitting said frame to tilt fore and aft relatively to said tractor about said supporting wheels, yieldable means resisting such tilting of said frame in one direction, and picking mechanism on said frame adjacent to the front end of the tractor.

6. The combination with a tractor comprising traction wheels and steering wheels, of a corn harvester comprising a frame embracing said tractor, supporting wheels for said frame at opposite sides of said tractor, a propelling connection between the body of said tractor and said frame permitting said frame to tilt fore and aft relatively to said tractor about said supporting wheels, yieldable means resisting such tilting of said frame in one direction, picking mechanisms on said frame at opposite sides of the tractor, and adjusting mechanism for tilting said frame in either direction to raise or lower said picking mechanisms.

7. The combination with a tractor, of an agricultural implement frame embracing said tractor and comprising an upwardly extending arch member extending over the tractor and a forwardly extending arch member extending around the front end of the tractor, supporting wheels for said frame, and a propelling connection between said tractor and frame permitting relative movement therebetween.

8. The combination with a tractor, of an agricultural implement frame embracing said tractor and comprising an upwardly extending arch member extending over the top of the tractor intermediate the front and rear wheels of the tractor, supporting wheels for said frame, and a propelling connection between said tractor and frame permitting relative movement therebetween.

9. The combination with a tractor, of an agricultural implement frame embracing said tractor and comprising an upwardly extending arch member extending over the tractor, frame members projecting forwardly from said arch member, frame members projecting rearwardly from said arch member, supporting wheels for said frame, and a propelling connection between said tractor and frame permitting said frame and its supporting wheels to move vertically relatively to said tractor.

10. The combination with a tractor, of an agricultural implement associated with said tractor comprising a pair of implement wheels, axles for said wheels, an upwardly extending arch member spanning the tractor and having its lower ends mounted on said axles, frame members projecting substantially longitudinally from said arch member, and a propelling connection between said tractor and implement permitting relative vertical movement therebetween.

11. The combination with a tractor, of an agricultural implement associated with said tractor comprising a pair of implement wheels, axles for said wheels, an inverted U-shaped frame member having its downwardly extending legs mounted on said axles and having its upper transverse portion arched over the top of the tractor, auxiliary frame structures connected with said inverted U-shaped frame member and disposed substantially between the downwardly extending legs thereof and the sides of the tractor, and a propelling connection between said tractor and implement permitting relative movement therebetween.

12. The combination with a tractor having a steering truck, of an agricultural implement frame connected to said tractor to be propelled thereby, a pair of dirigible supporting wheels for said frame, oscillatable means mounted on said tractor for sidewise swinging movement, means for transmitting motion from the tractor steering truck to said oscillatable means for swinging the latter sidewise, and steering connections extending from said oscillatable means to said dirigible implement wheels.

13. The combination with a tractor having a steering truck, of an agricultural implement frame, a pair of dirigible supporting wheels for said frame, a longitudinally extending arm pivotally supported on the under side of said tractor for sidewise swinging movement, a longitudinally extending arm secured to said tractor steering truck and operatively connected to transmit swinging motion to said first named arm, steering connections extending from said first named arm and said dirigible implement wheels, and a propelling connection between said tractor and implement frame permitting relative vertical movement therebetween.

14. The combination with a tractor, of an agricultural implement frame comprising supporting wheels, means operatively connecting said frame with said tractor permitting said frame and supporting wheels to have vertical movement relatively to said tractor and permitting said frame to have fore and aft tilting movement relatively to said tractor, and spring means yieldably cushioning one of said movements in one direction.

15. The combination with a tractor, of an agricultural implement comprising a frame, supporting wheels for said frame, means connecting said frame with said tractor permitting said frame and its supporting wheels to move vertically relatively to said tractor, picking mechanisms on said frame adjacent to the front end of the tractor, husking apparatus on said frame adjacent to the rear end of said tractor, and conveyors supported on opposite sides of said frame and extending upwardly and rearwardly for conveying the corn from said picking mechanisms to said husking apparatus, said conveyors diverging outwardly toward the rear from said picking mechanisms to said husking apparatus.

16. The combination with a tractor comprising a power take-off, of a corn harvester comprising a frame, means for connecting said frame with said tractor, a plurality of picking units mounted on the front portion of said frame, husking apparatus mounted on the rear portion of said frame, conveyor mechanism for conveying the corn from said picking mechanisms to said husking apparatus, a power transmitting connection between said frame and the power take-off on said tractor, said connection comprising two disconnectible parts adapted to be separated when said frame is disconnected from the tractor, and means for driving said plurality of picking mechanisms, said husking apparatus and said conveyor mechanism from said power transmitting connection.

17. The combination with a tractor having a substantially longitudinally extending power take-off shaft, of a corn harvester associated with said tractor comprising a frame picking mechanism on said frame adjacent to the front end of the tractor, an elevator disposed adjacent to the rear end of said tractor, means for transmitting power from the front end of said power take-off shaft to said picking mechanism, and means for transmitting power from the rear end of said power take-off shaft to said elevator.

18. The combination with a tractor including a power take-off device, of a corn harvester comprising a frame embracing the tractor, picking mechanisms mounted on said frame at opposite sides of the tractor, means operatively connecting said power take-off device with one of said picking mechanisms, and means for transmitting power to the other picking mechanism at the opposite side of the frame comprising a power transmitting device extending transversely across said frame in front of the tractor.

19. The combination with a tractor including a power take-off device, of a corn harvester comprising a frame associated with said tractor, picking mechanisms mounted on said frame adjacent to the forward end thereof, husking mechanisms mounted on said frame adjacent to the rear end thereof, means for conveying the corn from said picking mechanisms to said husking mechanisms, means for transmitting power from said power take-off device to said picking mechanisms, and shafts extending upwardly and rearwardly for transmitting power from said picking mechanisms to said husking mechanisms.

20. The combination with a tractor having a power take-off device, of a corn harvester comprising a frame associated with said tractor, picking mechanism mounted on said frame comprising snapping rolls and inner and outer gatherer chains, shafts operatively connected with said snapping rolls and said gatherer chains for driving the latter, said shafts extending upwardly and rearwardly substantially parallel with said snapping rolls, a forwardly extending shaft on said frame, means for operatively connecting said latter shaft with said power take-off device, a drive shaft mounted on said frame and extending upwardly and rearwardly, gear mechanism for connecting said forwardly extending shaft with said drive shaft, and means for transmitting motion from said drive shaft to said first mentioned shafts.

21. The combination with a tractor, of an agricultural implement comprising a frame of substantially horizontal U-shape with the open ends of the U at the rear of the frame, said tractor being driven forwardly into the frame through said open rear end, supporting wheels for said frame, and means connecting said frame with the tractor permitting the frame and its supporting wheels to rise and fall relatively to the tractor.

22. The combination with a tractor comprising traction wheels and a steering wheel, of an agricultural implement comprising a frame associated with said tractor, a supporting wheel for said frame, means connecting said frame with the body of said tractor enabling said implement frame and said supporting wheel to rise and fall in a substantially vertical plane relatively to said tractor and enabling said frame to tilt fore and aft relatively to said tractor about said supporting wheel, picking mechanism on said frame adjacent to the front end of the tractor, and an adjusting mechanism connected between said implement frame and the body of the tractor operative to tilt said implement frame fore and aft about said supporting wheel for raising and lowering said picking mechanism.

23. The combination with a tractor comprising front and rear wheels, of an agricultural implement comprising a frame embracing said tractor, supporting wheels for said implement frame at opposite sides of the tractor and disposed intermediate the axes of said front and rear tractor wheels, means connecting said implement frame with the body of said tractor enabling said frame and said supporting wheels to rise and fall in a substantially vertical plane relatively to said tractor and enabling said frame to tilt fore and aft relatively to said tractor about said supporting wheels, picking mechanisms on said frame at opposite sides of the tractor and adjacent to the front end of the tractor, and an adjusting mechanism connected between said implement frame and the body of the tractor operative to tilt said implement frame fore and aft about said supporting wheels for raising and lowering said picking mechanisms.

24. The combination with a tractor, of an agricultural implement comprising a frame embracing the forward end of the tractor, supporting wheel means carrying at least a substantial portion of the weight of said frame, means connecting said frame with said tractor permitting said frame to move relatively to said tractor, picking mechanism on said frame and projecting forwardly from the vertical plane of the axis of said wheel means, and husking mechanism on said frame extending rearwardly from said plane.

25. The combination with a tractor comprising rear traction wheels and a front steering wheel, of an agricultural implement comprising a frame embracing the tractor, dirigible supporting wheel means carrying at least a substantial portion of the weight of said frame, means connecting said frame with said tractor providing relative movement between the tractor and said wheel means while the latter supports, at least in part, said frame, steering means for causing said dirigible wheel means to be steered concurrently with the front steering wheel of the tractor, picking mechanisms on said frame at opposite sides of the tractor and projecting forwardly from the vertical axial plane of said dirigible wheel means, and husking apparatus on said frame extending rearwardly from said plane.

26. The combination with a tractor having a steering truck, of an agricultural implement frame connected to said tractor to be propelled thereby and comprising a forwardly extending arch member extending around the front end of the tractor and pivotally connected at its rear ends to the tractor for movement with respect thereto, a pair of dirigible supporting wheels mounted for swinging movement with respect to said frame and carrying at least a substantial portion of the weight of said frame, oscillatable means mounted on said tractor for sidewise swinging movement, means for transmitting motion from the tractor steering truck to said oscillatable means for swinging the latter sidewise, and steering connections extending from said oscillatable means to said dirigible implement wheels.

27. The combination with a tractor, of an agricultural implement comprising a frame of substantially horizontal U-shape with the open ends of the U at the rear of the frame, said tractor being driven forwardly into the frame through said open rear end, supporting means carrying at least a substantial portion of the weight of said frame, and means connecting said frame with the tractor permitting the wheel means to rise and fall relatively to the tractor.

28. A tractor propelled corn harvester comprising two sets of snapping rolls carried by the tractor, one on each side and opposite the steering means thereof, two longitudinally extending conveyors positioned on opposite sides of the tractor, one for each set of rolls, for conveying the ears of corn from the rolls to the rear of the tractor, chutes extending downwardly and inwardly from the ends of said conveyors, corn husking means carried by the tractor adjacent the rear thereof and arranged to receive ears of corn from said chutes, and an elevator at the rear of the tractor and centrally thereof for receiving the ears from said husking means and for delivering them into a wagon.

29. The combination with a tractor having a relatively narrow body supported on rear traction wheels and a front truck of a width not greater than the width of the tractor body, of an agricultural implement comprising a frame of substantially horizontal U-shape with the open ends of the U at the rear of the frame, said tractor being driven forwardly into the frame through said open rear end, two harvesting mechanisms carried by said frame, each mechanism comprising crop gathering means and rearwardly extending conveying means associated therewith, said mechanisms being positioned on opposite sides of the tractor body in close proximity thereto, the gathering means thereof being positioned near said truck, separate husking means carried by said frame on each side of the tractor rearwardly of said conveying means, an elevator separately mounted on the rear of the tractor and having a receiving end positioned substantially centrally of the tractor body, and means for conducting crop from said husking means into the receiving end of said elevator.

30. The combination with a tractor having a relatively narrow body supported on rear traction wheels and a front truck of a width not greater than the width of the tractor body, of an agricultural implement comprising a frame of substantially horizontal U-shape with the open ends of the U at the rear of the frame, said tractor being driven forwardly into the frame through said open rear end, supporting wheel means movable relative to the tractor and arranged to support at least a portion of the weight of the frame, two harvesting mechanisms carried by said frame, each mechanism comprising crop gathering means and rearwardly extending conveying means associated therewith, said mechanisms being positioned on opposite sides of the tractor body in close proximity thereto, the gathering means thereof being positioned near said truck, and husking means carried by the frame for receiving the crop from said gathering means.

31. The combination with a tractor having front dirigible and rear traction wheels, of a rigid generally U-shaped frame having its central portion embracing the front of the tractor and side portions extending along the sides of the tractor, a pair of laterally spaced gathering units carried at the forward end of said frame adjacent the central portion thereof, a pair of husking units supported upon the side portions of said frame and disposed substantially above the axis of said traction wheels, dirigible wheels for said frame disposed substantially midway between the gathering units at the front end of the frame and the husking units adjacent the rear end of the frame, said dirigible wheels being arranged to support at least a portion of the weight of said frame and the units carried thereby, and means interconnecting the dirigible wheels of said frame and the dirigible wheels of the tractor.

WILBUR J. COULTAS.
NORMAN F. ANDREWS.